US009219713B2

(12) United States Patent
Toledo et al.

(10) Patent No.: US 9,219,713 B2
(45) Date of Patent: Dec. 22, 2015

(54) ELECTRONIC ELECTRICITY METER WITH INTEGRATED DIGITAL-CERTIFICATION MECHANISM FOR SECURE COMMUNICATION

(76) Inventors: Fábio de Oliveira Toledo, Rio de Janeiro—RJ (BR); Welson Regis Jacometti, São Paulo (BR); Rodrigo Jardim Riella, Curitiba (BR); Celso Pinto Saraiva, Campinas (BR)

( * ) Notice: Subject to any disclaimer, the term of this patent is extended or adjusted under 35 U.S.C. 154(b) by 0 days.

(21) Appl. No.: 13/989,766

(22) PCT Filed: Nov. 25, 2011

(86) PCT No.: PCT/BR2011/000436
§ 371 (c)(1),
(2), (4) Date: Mar. 24, 2014

(87) PCT Pub. No.: WO2012/068656
PCT Pub. Date: May 31, 2012

(65) Prior Publication Data
US 2014/0294178 A1    Oct. 2, 2014

(30) Foreign Application Priority Data
Nov. 25, 2010    (BR) ...................................... 1006951

(51) Int. Cl.
H04L 29/06    (2006.01)
G01R 22/06    (2006.01)
H04L 9/32    (2006.01)
G01D 4/00    (2006.01)
H04Q 9/00    (2006.01)

(52) U.S. Cl.
CPC ............ *H04L 63/0428* (2013.01); *G01D 4/002* (2013.01); *G01R 22/063* (2013.01);
(Continued)

(58) Field of Classification Search
CPC ....... H04L 9/32; H04L 9/3247; H04L 9/3263; H04L 63/0823; H04L 63/08; H04L 9/3281; H04L 63/0428; H04L 9/3236; H04L 63/126
USPC .......... 380/255, 270; 713/150, 168, 176, 171, 713/175, 180
See application file for complete search history.

(56) References Cited

U.S. PATENT DOCUMENTS 5,828,751 A * 10/1998 Walker et al. ................. 713/175
6,606,744 B1 * 8/2003 Mikurak ....................... 717/174
(Continued)

FOREIGN PATENT DOCUMENTS

WO    03027800 A2    4/2003
WO    2010013090 A1    2/2010

OTHER PUBLICATIONS

Efthymiou, C.; Kalogridis, G., "Smart Grid Privacy via Anonymization of Smart Metering Data," Smart Grid Communications (SmartGridComm), 2010 First IEEE International Conference on , vol., No., pp. 238,243, Oct. 4-6, 2010 doi: 10.1109/SMARTGRID.2010.5622050.*

*Primary Examiner* — Yin-Chen Shaw
*Assistant Examiner* — Carlos Amorin
(74) *Attorney, Agent, or Firm* — Steptoe & Johnson LLP (57) ABSTRACT

Electronic electricity meter with integrated digital-certification mechanism for secure communication, comprising current sensors, voltage sensors, electronic circuit for conditioning the current signals and voltage signals in the electrical levels required by the processing unit, processing unit able to continuously sample the current signals and voltage signals provided by the circuit and that reflect, using a known ratio, the real value of the current and voltage delivered to the meter connection terminals, the processing unit calculates the active and passive through energy and determines the energy values to be counted, and a communication unit, linked to the processing unit, which uses a digital data protocol and a physical interface to communicate with the world outside the meter, and a processing unit with digital certification functions located between the processing unit and the communication unit.

3 Claims, 4 Drawing Sheets (52) U.S. Cl.
CPC ............ *H04L9/3236* (2013.01); *H04L 9/3247* (2013.01); *H04L 9/3263* (2013.01); *H04Q 9/00* (2013.01); *H04L 63/126* (2013.01); *H04L 2463/041* (2013.01); *H04Q 2209/60* (2013.01); *Y02B 90/241* (2013.01); *Y04S 20/32* (2013.01); *Y04S 40/24* (2013.01)

(56) References Cited

U.S. PATENT DOCUMENTS

| | | | |
|---|---|---|---|
| 7,162,379 B2 | 1/2007 | Jang et al. | |
| 8,670,946 B2* | 3/2014 | Salazar et al. | 702/62 |
| 2005/0144437 A1* | 6/2005 | Ransom et al. | 713/151 |
| 2006/0206433 A1* | 9/2006 | Scoggins | 705/63 |
| 2008/0150753 A1* | 6/2008 | Rudolf et al. | 340/870.03 |
| 2010/0241848 A1* | 9/2010 | Smith et al. | 713/153 |
| 2010/0306533 A1* | 12/2010 | Phatak | 713/156 |
| 2011/0022845 A1* | 1/2011 | Pietre-Cambacedes et al. | 713/175 |
| 2011/0093396 A1* | 4/2011 | Parkos et al. | 705/63 |
| 2011/0266869 A1* | 11/2011 | Katru et al. | 307/39 |

* cited by examiner

ELECTRONIC ELECTRICITY METER WITH INTEGRATED DIGITAL-CERTIFICATION MECHANISM FOR SECURE COMMUNICATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to digital electrical energy meters and particularly to digital electric energy meters, having a device providing digital certification for data measured and transmitted by said measuring device.

BACKGROUND

Electronic electricity meters with automatic reading are already known in the prior art. Document PI 0503956-8, deposited on Sep. 8, 2005, published on May 22, 2007, entitled "Electronic reading device, applicable with a digital electric energy reading device, provided with an interface for automated reading", features an electronic device with the purpose of accomplishing automated reading of an energy consumption value, accumulated through a digital measuring device. Said reading system if provided with a flash memory card or similar device to record data captured through a communication interface with or without wire; said reading device features a microcontroller which is responsible for communication with the consumption meter, said data integration and recording in the memory storage; after data collection and recording in said memory storage, it suffices to remove said card, which is being introduced in a reading device, coupled to a computer and process said data with the object of permitting the issue of charge bills/invoices to network consumers. Said device is a memory card to record data from the measuring device which, upon being inserted into a reading device, coupled to a computer, generates billing notes. Said document does not cover nor mentions an electronic device with a digital certification mechanism to provide safe data transmission from an electronic measuring device, for example, to a control center.

Document PI 0516274-2, filed on Sep. 30, 2005, international publication date Apr. 20, 2006, entitled "Electric energy prepayment method, method for automatic monitoring electrical energy supply, method to obtain information about the use of an electronic prepayment device, prepayment method and electrical energy supply control and prepayment system and electrical energy supply system" reveals the use of a measuring device wholly integrated in one sole piece, fully covered and without outside contact, incorporating a prepayment system and a more efficient method of monitoring the supply of electrical energy and obtaining relevant information about said measuring device through intelligent cards, without contact.

SUMMARY

The object of the present invention is to provide a digital electrical energy measuring device, featuring a chip with an integrated digital-certification mechanism to provide electronic signature to consumption measuring data to be transmitted to a control center. Other features and advantages will become apparent from the following detailed description, taken in conjunction with the accompanying drawings, which illustrate by way of example, the features of the various embodiments.

DETAILED DESCRIPTION OF THE INVENTION

The present invention relates to digital electric energy measuring devices, featuring a device providing digital certification for data measure and transmitted by said measuring device. Thus, the measurement device of the present invention provides safety and data tracking resources, permitting both electricity distribution companies (concessionaires) as well as to consumers to check the accuracy of data made available by the measuring devices, which are being utilized in the consumption billing procedures and demand of electrical energy.

The present invention basically relates to a digital electric energy measuring device which incorporates software and electronic components to store a digital certification and through which to render available electronically signed data by its data communication gates. Thus, said data may be transported to the electrical power distributing company with the assurance that they cannot be altered and, additionally, permitting that their respective origin be digitally verified, which insures two fundamental aspects of the consumer billing procedure and electrical energy demand, concerning both the electrical power distributing company as well as the consumers, representing a guarantee that said data actually are assigned to the measuring device allocated to the consumer and assuring, furthermore, that said data were not unduly altered, modified or incorrectly annotated during the reading process. Based on the above, a real guarantee is being offered to the electrical energy distributing company as well as to the consumer, involving the data validity, resulting in an invoice for consumption and demand of electrical energy.

The use of electrical energy by residences, trade and industry is a feature of modern society, and this practice has been initiated over a period of one hundred years. Electric energy measuring through meters is a practice that started almost at the same time. Initial patents of invention associated to electromechanical electric energy measuring devices were requested by Gardine (1872) and by Fuller (1878) and since then it has become common practice worldwide to install an electric energy measuring device at the entrance of a residence or commercial or industrial premises, designed to record electrical energy consumption figures used by consumers, with the purpose of rendering feasible billing/invoicing procedures. Since their invention, electrical energy measuring devices feature at their front panel information permitting to record consumption figures within a given period, for example, of 1 month, by means of manual annotation procedures and cyclic bookkeeping, so that adequate values could be charged to each consumer.

In more recent times, with the advent of electronics, electrical energy measuring devices turned into electronic devices, avoiding the use of gears and analog displays, favoring utilization of electronic circuits and digital displays to present consumption data and demand of electrical energy.

In electronic measuring devices, in addition to manual reading (verification of values featured in digital displays and their annotation on paper or portable computer devices), which rendered feasible the collection of data through communication gateways available in said measuring devices and which, by means of electronic processing (interfaces and digital data protocols) rendered it possible to avoid manual writing of information. Such a step provides not only higher speed levels for data reading, but also features a trend of possible human failures in the process of manual annotation of data.

Electronic processes in instruments of electronic measuring, therefore, generate data—through electronic communication gates and digital protocols,—which, in a last instance, generate records of data which will subsequently be inserted on large databases, thus originating electric energy billing/invoicing procedures.

While the evolution ever since initial electro-mechanical measuring devices to electronic electric energy measuring devices is remarkable, and the reduction—both in metrological errors (which is basically noted by the increase of precision of measuring devices with the passage of years)—due to human errors of manual reading procedures of values measured in the billing process, modernity of electronic measurement introduced, in the context in billing procedures, new problems in the area of reading, billing and collection, involving electric energy distributors and consumers alike.

In the first place, said electronic electrical energy measuring procedures by adding the possibility of reading measuring data by means of measurement through communication gates, either with a portable electronic collecting unit, or by any other remote collection device of information (such as, for example, digital modems) for reading from a distance, operate based on the concept of digital data protocols. Said protocols permit obtaining information internally stored in measuring devices by means of command sequences and answers, within the area of data communication—in an invariable manner, data transports are conducted from the measuring device to one or more computers until data will be introduced in the billing system, which will undertake the processing of an invoice for the consumer. There exists the first problem of the prior art, which required to be solved: there is an uncountable number of ways to alter, on purpose or accidentally, data originally obtained by the measuring device. These alterations, independently from a motivation, will cause discrepancies between the original data, provided by the measuring device and the data effectively processed, generating possible errors in invoicing, which will negatively interfere in the electric energy distribution process, as well as in the correct customer service.

In the first place, it is known that software errors, operational errors, data transmission errors, as well as false data manipulation may take place and, despite of modern resources and precision of electronic measuring devices, the billing process, in the form it occurred in reading errors and manual annotation of operators for manual annotation of electro-mechanical measuring devices, is being compromised. (A)

Secondly, digital protocol communication devices, provided in said electric energy measuring devices, were conceived to coordinate, by means of binary sequences of communication of questions and answers, the exchange of information between measuring device and a local or remote reading device. In data informed, usually information is contained specifically concerning the measurement device (serial number, operational parameters, configurations, models, brand and manufacturer amongst others), as well as information on measurement (value of active and reactive energy recording devices, values concerning voltage, current, maximum demands, amongst others). While this information a priori appears to be sufficient for a safe billing/invoicing process, they actually ignore the first problem already shown, only that, at this time, in the case specifically concerning information from a measuring device. In other words, in the same way in which it is possible to manipulate, by error or intentionally, data measured (readings); it is also feasible to identify the measuring device per se. This provides a new range for a host of errors and fraudulent measurement procedures, since—with the knowledge of how to generate data information of a measuring device—it is possible to generate false measurement information, based, for example, on a microcomputer. In the manual process, this would be equivalent to fictitious reading, generated by forged documents, but when applied to the level of electronics it is much more complex to be detected and managed and which, potentially, could bring complete chaos to industry of electric energy distribution—and consequently to consumers.

With data from an electric energy measuring device, it is possible to track—based on the serial number—the measuring device which originally generated the information. However, as indicated above, even the serial number per se could be altered in the data files, so that said tracking would be deficient and would not serve the purposes of significantly increasing the safety in the process (B).

Thirdly, there is a question of a regulatory nature which is present in practically all countries over the world and which concerns metrological safety of electric energy measuring devices, as represented by the verification of each model, type and manufacturer of electric energy measuring devices by a host of regulatory rules by a Metrological Agency. In Brazil, INMETRO—Institutor National de Metrologia (National Institute for Metrology) is in charge of this function and according to rules presently in force, any electric energy measuring device, utilized in the consumer billing/invoicing process has to be submitted to INMETRO for accomplishment of metrological verification tests. Any new model, brand and type of measuring device, such as the manufacturer specifically, are also being verified by INMETRO to check whether they—according to metrological specifications and demands—are fulfilling said demands defined by a document entitled RTM—Regulamento Técnico—Metrológico (RTM—Technical Metrological Regulation), defining minimum requirements to be pursued in terms of metrology, to provide correct service to the user market of measuring devices, electrical energy distributing companies and providers of measuring devices.

In addition to verifying the correct compliance with the rules for a new measuring device, INMETRO, and possibly other agencies and regulating bodies, also determine procedures to be pursued in, at least, three other situations: during consumer complaints concerning a measured value (procedures are defined to be pursued by distributing companies and by consumers for checking the correct operation of a measuring device), at the occasion of a removal of a measuring device from its installation in the field for maintenance (regulations are defined to be followed by distributing companies and companies in charge of maintenance services and manufacturers of measuring devices to certify the correct operation of a device after a maintenance) and, lastly, according to each type of application of measuring device, when new verifications should be made with said device to see if its performance does not suffer degradation over time.

According to the present technical status, metrological procedures are being carried out through a host of documents, verifications and auditing procedures. Consumer is being advised about the correct execution of legal and regulatory procedures by means of a stamp, identifying the measuring device vis-à-vis the Metrological Authority, said stamp being usually printed or pasted on the measuring device.

It is unnecessary to argue that, while measuring device manufacturers, consumers, electric energy distributing companies and the Metrological Authority itself are all institutions of physical persons of renowned reputation—composing what we could call a Corporation, manual procedures, administrative procedures and pasted or printed stamps on measuring devices, offer but reduced safety towards the complex lifetime cycle of an electric energy measuring device.

It is a quite common fact that there is a large number of electrical energy measuring devices installed in residences and commercial and industrial premises with more than 30 years of use without undergoing any metrological verification. This is due to the fact that there are natural difficulties involved in installing and maintaining a large number of measuring devices in the field, and consequently, provides these measuring devices a treatment due in consonance with regulations. This fact becomes more aggravating in its nature since stamps, printed or pasted material on said devices, are subject to fraud, which may occur with the fraudulent object of introducing measurement errors on purpose, again causing errors in billing/invoicing procedures. There are hundreds of millions of electric energy measuring devices installed in the world and it is unlikely that all these units are in total compliance with existing metrological rules in each country where said units are installed. It is most likely that there is an important number of such devices which are in disagreement with the metrological rules, thus negatively affecting consumers and electric energy distributing companies alike on a worldwide scale, thus generating commercial losses which are, practically, in all parts of the world, shared by all consumers. (C)

Digital certification is a name assigned to a set of computational techniques, usually accomplished in a separate manner in an integrated circuit (chip)—such as those used in so called banking smart-cards, associated to the technology of public keys. These techniques and technology permit: a) determine a pair of keys (numerical values) for a certain chip, which is a public key (which will be provided for the knowledge of any interested party), in addition to a private key (exclusively integrated in said chip or smart-card). Said pair of keys, by means of a set of algorithms and computational functions, in a standard known as X.509 or ICP—Infraestrutura de Chaves Públicas (ICP—Infrastructure of Public Keys), provide a signature function (generation of a mathematical code which synthesizes a set of data in a unique manner) and cryptography (cipher of a set of dates of cryptographic algorithms). These functions, jointly, determine a context of safety, providing two important resources for electronic transactions: confidentiality and non-rejection. Confidentiality, determined by the data cipher from a sender (A) to an addressee (B), with (A) utilizing the public key of (B), so that only (B), in possession of his private key, is capable of deciphering the data. Non-rejection, determined by a digital data signature by a sender (A), utilizing his private key to cipher an abstract (hash) of the content sent to an addressee (B), so that (B)—deciphering a digital signature (obtaining the hash generated by sender) and (B) himself, by generating a hash through the same algorithm—will be capable of comparing both values and, in the event of a coincidence, obtain confirmation that data sent by (A) has not undergone any alteration until arriving at (B).

Digital Certification has been successfully utilized by financial institutions, through the worldwide net of computers (Internet) and public and private institutions all over the world to provide safety to electronic transactions.

Due to its hierarchical structure of issuing "Digital Certificates", which are electronic instruments generated by a "Certifying Authority", Digital Certification is especially adequate to replace documentary processes and was adopted in different countries, including in Brazil, as a technological base to offer assurances to electronic transactions accomplished over the Internet. In Brazil, especially ITI (Instituto Nacional de Tecnologia da Informação)—(National Institute of Information Technology)—directly connected to the Presidency of the Republic, has created ICP-Brasil (Infraestrutura de Chaves Públicas do Brasil (Public Key Infrastructure in Brazil) to regulate the issue of digital certificates, setting up Brazilian Certifying Agencies and, by means of specific legislation, assign equivalence to electronic transactions accomplished under the aegis of Digital Certification towards transactions accomplished on paper. Thus, ever since 2002, digital certification has been serving as a base—for example, the Brazilian System of Payments (SPB) (SPB—Sistema de Pagamentos Brasileiros). which covers the interconnection of the banking system to the Brazilian Central Bank, thus reducing financial risks, associated with the Brazilian economy, trade system and providing a host of benefits for the country.

Digital Certification has been conceived to cover the safety of electronic transactions among private persons and public or private institutions, utilizing computer networks.

The present invention was conceived, on one side, to set forth safer standards for distributors and consumers, concerning collection of information from electric energy measuring devices and, on the other hand, to cooperate with the Metrological Authority and Regulating Organizations of the process of electrical energy distribution with more efficient tools for qualification and monitoring of measuring devices which they certify and approve.

According to said objectives, the present invention is subsequently shown with a detailed description of each component, with reference to the attached sheets of drawings.

The present invention does not cover neither an electric energy measuring device nor the use of digital certification for data communication, but covers both jointly utilized, so as to materialize the objectives mentioned above in their entirety and in an absolutely innovate form.

Figure 1:
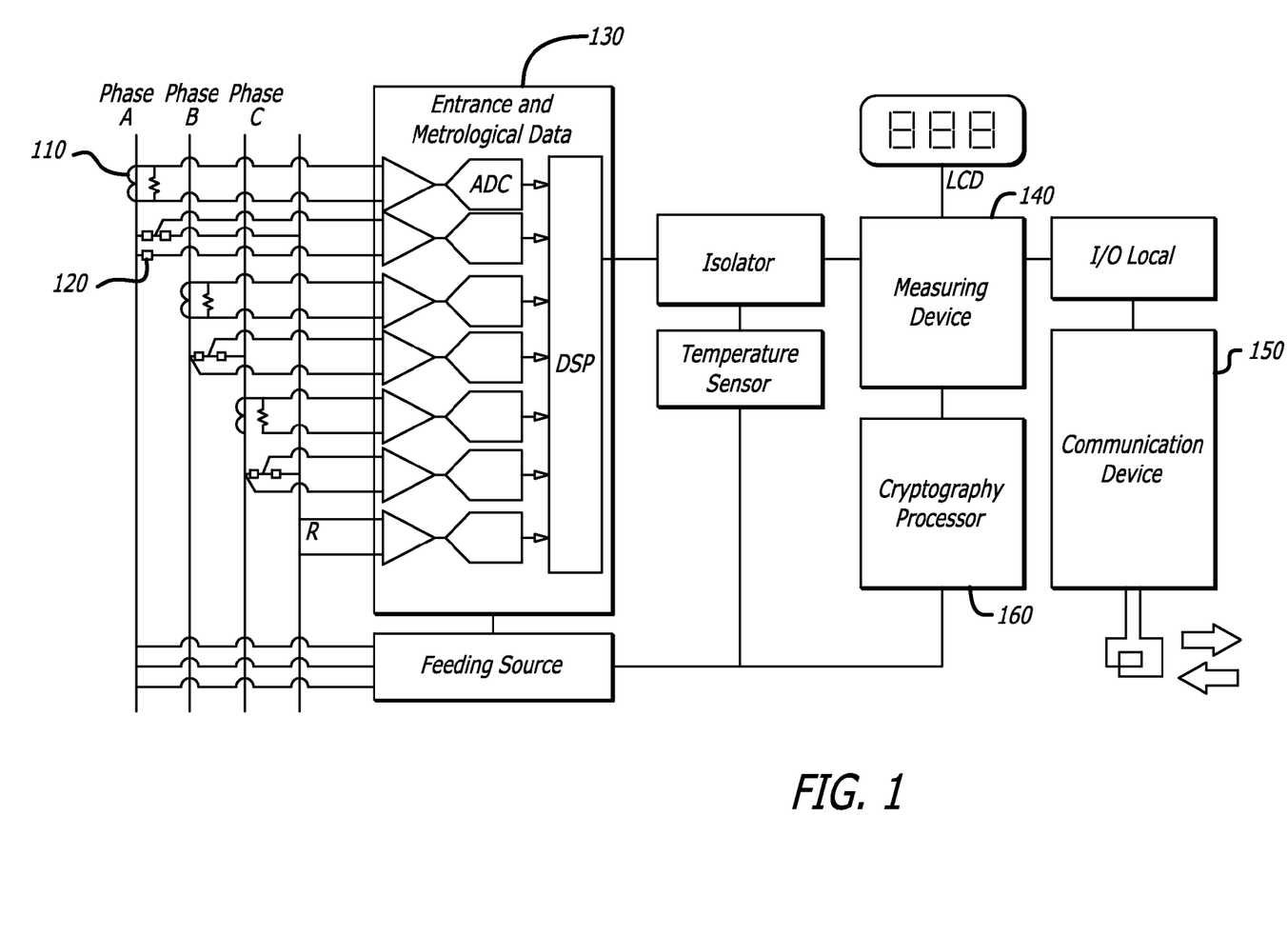
FIG. 1 is a schematic view of an electric energy measuring device, featuring its main components.

FIG. 1 features a schematic diagram of an electric energy measuring device with its main components: the presence of current sensors 110, the presence of voltage sensors 120, the existence of an electronic circuit 130 for conditioning the current signals and voltage signals in the electrical levels required by the processing unit 140, a processing unit 140 capable to continuously sample of the current signals and voltage signals, provided by circuit 130 and which reflect, by means of a known relation, the real value of current and voltage delivered at the connecting terminals of the measuring device. The processing unit 140 accomplishes the calculation of active and reactive energy which are being delivered and determines energy values to be counted. A communication unit 150, associated to the processing unit 140 and which, by means of a digital data protocol and a physical interface, is linked with the outer world to the measuring device (users and remote communication devices). A processing unit with digital certification functions 160 is integrated between the processing unit 140 and the communication unit 150. This Processing Unit of Digital Certification Functions (UPFCD) has as its object to undertake cryptography and signature of all data made available, through the data protocol of the communication unit 150 to the outer world, so that the electronic relationship with said measuring device, concerning data communication, will be directed by the use of the Digital Certification Technique natively and non-separable.

Figure 2:
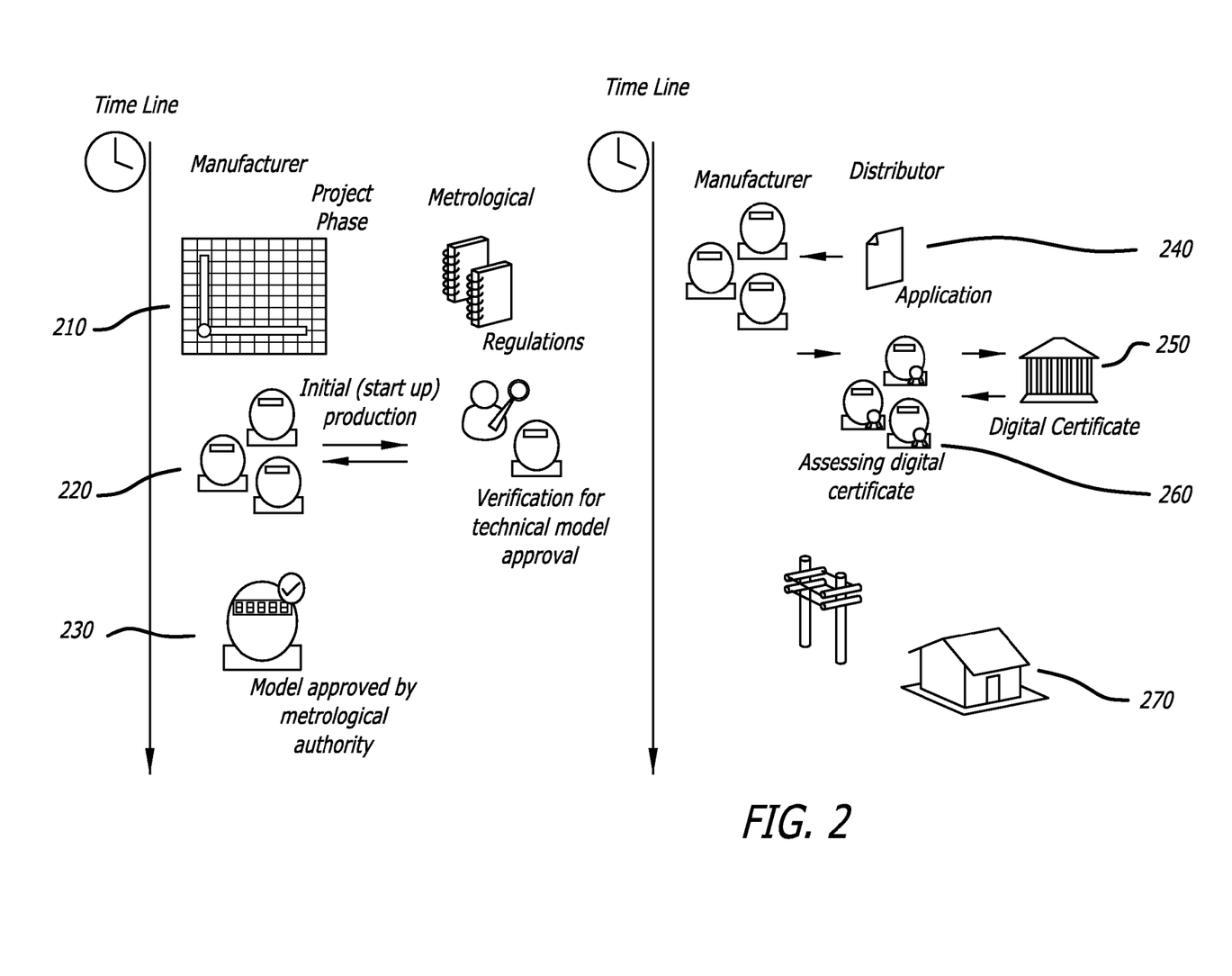
FIG. 2 is a view of said electronic measuring device, conceived in different models.

FIG. 2 features said electronic measuring device, once conceived in different models (for measuring different types of consumers, ever since the residual dimension until the industrial dimension in a flow that evidences its lifecycle from a viewpoint of a project (Step 210), a production of reference units (Step 220), the featuring of the measuring device to the Metrological Authority for Appreciation and Technical Model Approval (acceptance and confirmation by said Metrological Authority as to the applicability of said instrument in official measuring processes for billing/invoicing purposes) Step 230), a purchase request Step 240), originated from a buyer (usually an electrical energy distributing company, but essentially any company or citizen authorized to utilize said instrument for measuring billing procedures, the issue of digital certificates Step 250) based on a request from buyer submitted to Metrological Authority for measuring devices which were already certified, the load factor of digital certificates (Step 260) in measuring devices purchased by buyer, and the utilization of electronic measuring devices (Step 270) with their respective digital certificates in real procedures for measuring billing/invoicing purposes.

At this point, it will be necessary to describe, in detail, the flow in FIG. 2. The phase featured in Step 210, related to the instrument project, is not being specified and it is presupposed that the conceived measuring device is of such an order that it respects the schematic diagram shown in FIG. 1, i.e., utilizing electronic components capable of supporting digital certification functions (store a digital certificate, public and private keys associated to said certificate, cipher, decipher and sign data electronically).

The phase shown in Step 220 relates to the period of time in which said measuring device—already conceived and with its manufacturing process defined and accomplished (until the point of interest to manufacturer) does not yet possess—pursuant to the terminology of the Brazilian Metrological Authority (INMETRO), a Technical Approval of Model. considered as a base point the terminology adopted in Brazil and valid in the context of OIML (International Legal Metrology Association—ILMA) any measuring device, a measure implemented or part of same, object of metrological regulation—either manufactured in Brazil or imported, must obtain an approval of its model, according to the applicable technical metrological regulation, before being released for marketing or utilization.

Furthermore, pursuant to INMETRO, model approval is a decision of a legal nature, based on the technical model evaluation report (ATM), confirming that said model is a measuring device that satisfies the requirements of regulations and may be used in the regulated field, offering trustworthy results during a defined period of time.

Thus, the phase shown in Step 230 reflects a set of actions through which a manufacturer or equivalent entity submits to INMETRO a model to be an object in an ATM (Technical Model Approval). In the present invention, as a whole part is the consideration that, effectively, the Metrological Authority and the Certifying Authority are complementary in nature and that the digital certificate issued for a measuring device requires, on a prior basis, that said instrument has been previously received its Technical Model Approval for recording purposes. As a consequence, a future issue of a digital certificate, this will be issued only for instruments which previously received an ATM (Technical Model Approval) within a certification standard containing—in the digital certificate—the data which are of concern to the Metrological Authority, such as model name, manufacturer name, Identification of requesting electrical energy distributing Company and date of validity of certification, all in agreement with the basic definition of the specific process of said Technical Model Approval. Consequently, it can be stated that the digital certificate bestows a stamp onto the instrument—not only printed or pasted on its outer section, but inserted in a fashion as to be present in all communications of said instruments in practical field utilization.

Digital Certificates actually only will be existing after having been requested by a buyer for utilization in a given set (quantity and model), defined by a measuring device. Due to this reason, step 240 presents a purchase request to a measuring device manufacturer. Considering legal requirements set forth by said Metrological Authority, the Purchase Order of measuring devices, whose purpose of utilization is regulated, must also be accompanied by a request to the Metrological Authority for issuance of competent certificates (quantity and model).

Step 250 features a phase in which said Metrological Authority, after having verified the validity of the request for issue of digital certificates, proceeds with the issue, delivering the digital certificates to requesting party who, on their turn, will undertake its loading procedure into the measuring devices, as shown in step 260.

Step 270 features utilization of measuring device in the field, so that all its communications will be ciphered and signed according to the digital certification technique. In view of difficulties earlier exposed with the actual state of the prior art, step 270 features as its huge advancement and innovating content involving the fact that the period of validity of said digital certificate, assigned to instruments issued pursuant to the specific norm of said Technical Model Approval, as defined by the Metrological Authority, may be verified in any and all data communication with the measuring device. As a consequence, an indelible, irrevocable and undeniable feature of a validity date, assigned, in its baseline, by the Metrological Authority, settling in a straightforward manner, issues formerly described (C).

Figure 3:
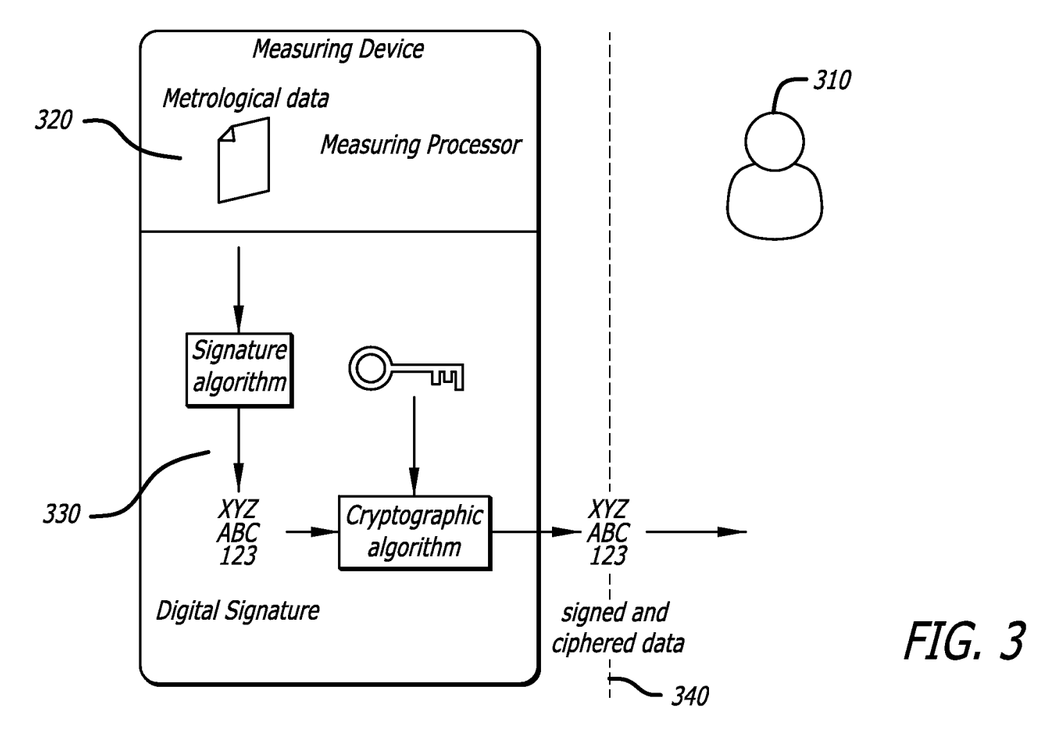
FIG. 3 is a use diagram of a measuring device with its respective digital certification mechanism.

FIG. 3 features a diagram of utilization of a measuring device with its respective digital certificate, where: Step 310 features a request originated from the data collector or remote communication device for measurement data, Step 320 features the composition of data (package) which will be applied by the internal processing unit to measuring device, Step 330 features a treatment of a data package, by the UPFCD unit—which bestows cryptography and digital signature on the package (ciphered and signed package), Step 340 features delivery of ciphered and signed package to communication unit (communication gateway) which undertakes delivery to the outer world to the measuring device.

Figure 4:
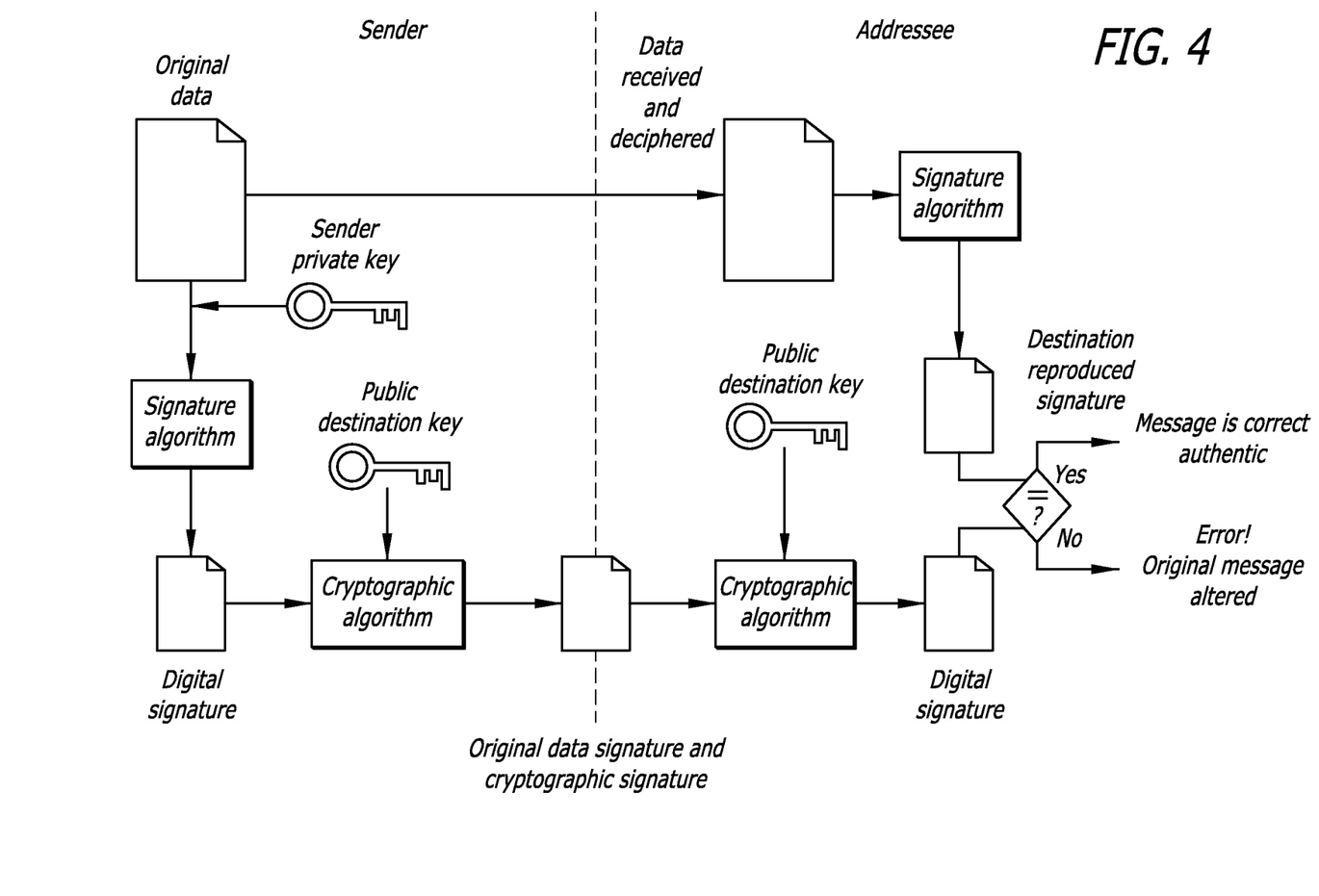
FIG. 4 features (a) cryptographic techniques (encrypting and decrypting) and (b) digital signature of a data package.

FIG. 4 features cryptography techniques (ciphers and deciphers) and digital signature of a data package.

In accordance with the ICP technique (Infrastructure of Public Keys), ciphered and electronically signed data are guaranteed concerning their origin. This means that addressee of data (in a last instance, the electric energy distributing company) are in condition to verify the existing signature in the received data package and, by means of the validation, are confident as to its origin. Consequently, the present invention offers to said data a data tracking feature upon their original (measuring device) until the electric energy distributing company (addressee of information), which, pursuant to the stage of the prior art, simply does not exist, settling in a straightforward matter another of the problems related above (B).

Lastly, and still in accordance with the ICP technique Infrastructure of Public Keys), ciphered and signed data are guaranteed as to their content. This means that addressee of data is in conditions to check the existing signature in the received package data and evaluate whether its content agrees with the originally posted package by sender (measuring device) or whether it underwent a change during the routing process. Once this assurance is provided, by means of validation of content of communication, the electric energy distributing company (addressee of information) will have the required safety to accept said information as being valid and, therefore, move ahead with consumer billing/invoicing procedures, to who said data are destined. This feature settles in a straightforward manner another of the problems already described (A).

In an absolutely innovating fashion, the present invention settles, automatically, a series of collateral problems, associated to the electric energy billing/invoicing process. Any consumer may demand—in addition to the presently already available energy measurement procedure—the final digital evidence that his billed invoice amount is based on data electronically signed by his measuring device. Thus, consumer—in a fashion similar to the electric energy distribution company—will be absolutely sure that his invoice billing was originated from the measuring device installed in his residence or commercial or industrial premises.

In the same fashion, any judicial dispute arising of the measurement process, in a phase of expertise examination, may be strictly based on the metrological measurement aspects, since questions of adaptation of measurement and process correction of data communication until processing, the digital certification will provide the required tools to validate the procedure.

Through said Technical Model Approval, the Metrological Authority may determine the digital certification standard (content and period of validity as of date of issue) to be used in each field-installed instrument, thus generating—in an objective and verifiable manner—the correct application of regulations associated with said measuring device. This covers not only the period of validity, but several other aspects which are liable to affect a measurement device offered for sale on the market, including the cancellation of models or manufacturers. A previously approved (ATM) measurement device, whose manufacturer, subsequently, does not meet the legal requirements, may not only have any future issues of new digital certificates denied, but already issued certificates may, within the ICP technique, be cancelled, so that their utilization in the field, be it automatically and in centralized fashion (under the control of the Metrological Authority), may be invalidated, thus assuring to consumers that only instruments which are in consonance with the regulations, are effectively being utilized and providing safety to the commercial process of distribution of electrical energy.

What is claimed:

1. An electric energy measuring device with an integrated digital-certification mechanism for safe communication, the measuring device comprising:
   current sensors;
   voltage sensors;
   an electronic circuit that conditions current and voltage signals;
   a current and voltage signal processor that enables continuous sampling of current and voltage signals of the electronic circuit, wherein a real value of current and voltage delivered at connecting terminals of the measuring device is reflected, wherein the current and voltage signal processor calculates passing active and reactive energy and determines energy values to be counted;
   a communication interface associated with the current and voltage signal processor that communicates using a data protocol and a physical interface; and
   a digital certification processor that is positioned between the current and voltage signal processor and the communication interface, wherein the digital certification processor encrypts and signs data of energy values using the data protocol of the communication interface and encryption keys of stored digital certificates;
   wherein a digital certification technique of the digital certification processor is native and non-separable;
   wherein the digital certificates contain information about a manufacturer, model, user, name of requesting electrical energy distributing company, and a period of validity of a certification related to a Technical Model Approval; and
   wherein determination of validity of the measuring device comprises verifying the information about manufacturer and model in the digital certificates with regulation requirements.

2. The measuring device according to claim 1, further comprising, processing of digital certification functions that accomplishes cryptography and digital signature functions utilizing public key infrastructure technology.

3. The measuring device according to claim 1, further comprising, permitting the measuring device to enable validation of the data received by the electric energy distributing company during any communication of the data originated from the measuring device.

* * * * *